United States Patent
McCormack et al.

(10) Patent No.: US 6,853,719 B2
(45) Date of Patent: Feb. 8, 2005

(54) PROVISION OF MEDIA CONTENT TO TELEPHONY CALLERS ON-HOLD

(75) Inventors: Tony McCormack, Galway (IE); Joseph Smyth, Galway (IE)

(73) Assignee: Nortel Networks Limited, St. Laurent (CA)

( * ) Notice: Subject to any disclaimer, the term of this patent is extended or adjusted under 35 U.S.C. 154(b) by 416 days.

(21) Appl. No.: 09/815,323

(22) Filed: Mar. 22, 2001

(65) Prior Publication Data

US 2002/0136384 A1 Sep. 26, 2002

(51) Int. Cl.$^7$ ............................................. H04M 3/42
(52) U.S. Cl. ............................ 379/215.01; 379/201.01; 379/214.01
(58) Field of Search ................ 379/265.01–265.14, 379/266.01–266.1, 393, 214.01, 76, 88.13, 88.17, 88.22, 88.23, 88.24, 88.25, 93.21, 100.11, 102.03, 120, 157, 158, 201.01, 202.01, 205.01, 208.01, 243, 268, 202.1, 207.06, 207.07, 215.01

(56) References Cited

U.S. PATENT DOCUMENTS

| | | | | |
|---|---|---|---|---|
| 5,884,262 A | * | 3/1999 | Wise et al. ................. | 704/270 |
| 5,946,378 A | * | 8/1999 | Farfan ..................... | 379/88.23 |
| 5,990,933 A | * | 11/1999 | Ozone et al. ................ | 348/15 |
| 5,991,374 A | * | 11/1999 | Hazenfield ............. | 379/101.01 |
| 6,195,426 B1 | * | 2/2001 | Bolduc et al. .............. | 379/266 |
| 6,208,729 B1 | * | 3/2001 | Agraharam et al. | |
| 6,400,804 B1 | * | 6/2002 | Bilder ......................... | 379/76 |
| 6,456,601 B1 | * | 9/2002 | Kozdon et al. .............. | 370/259 |
| 6,526,041 B1 | * | 2/2003 | Shaffer et al. .............. | 370/352 |
| 6,556,670 B1 | * | 4/2003 | Horn ..................... | 379/202.01 |
| 6,584,490 B1 | * | 6/2003 | Schuster et al. ............ | 709/200 |
| 2001/0012335 A1 | * | 8/2001 | Kaufman et al. | |
| 2003/0161464 A1 | * | 8/2003 | Rodriguez et al. | |

FOREIGN PATENT DOCUMENTS

| | | | |
|---|---|---|---|
| EP | 0987846 | * | 3/2000 |
| GB | 2343081 | * | 4/2000 |
| WO | WO 99/34579 | * | 7/1999 |

* cited by examiner

Primary Examiner—William J. Deane, Jr.
(74) Attorney, Agent, or Firm—Barnes & Thornburg LLP (57) ABSTRACT

A method of providing media content, such as music and video, to callers on hold involves the generation of the media content locally in the environment of the held caller, rather than the transmission of the content over the network. The local call server of the held caller is signalled when the call has been placed on hold by the server which has placed the call on hold. The caller's server then activates a music-on-hold server (or other media content generator) to provide the media content directly to the caller's telephony terminal. The advantage of this is that the media content is not transmitted across the network, allowing a higher bandwidth to be used locally for the media content without utilizing wide area network resources. This results also in the media content being provided in a higher quality format to the caller, avoiding the loss of quality associated with transmitting music using compressive voice codecs over packet-based networks.

29 Claims, 5 Drawing Sheets

PROVISION OF MEDIA CONTENT TO TELEPHONY CALLERS ON-HOLD

FIELD OF THE INVENTION

The present invention relates to the provision of media content to callers on-hold in telephony applications. The invention has particular application in the provision of music and other audio content in voice telephony over packet-based networks.

BACKGROUND OF THE INVENTION

In traditional circuit-switched voice networks, a basic feature of many private branch exchanges (PBXs) is music-on-hold (MOH). A caller may be placed on hold either by a user of a handset connected to the PBX or automatically (e.g. while queuing for an operator to answer a call). In either case, the PBX switches MOH onto the voice channel as soon as the caller is placed on hold, so that music is delivered to the caller while he or she is holding.

The source of the MOH may, for example, be a disk or tape drive connected to the PBX, or a radio tuner which delivers the content of a radio station to the caller, or it may be electronically generated music from the PBX. In any case, this music is delivered in either digital or analog uncompressed format with minimal distortion to the caller who is placed on hold.

With packet-based voice networks, valuable Wide Area Network (WAN) resources are used whenever a voice call is made. Voice signals are therefore normally compressed by means of an algorithm known as a codec, before being transmitted as packets across the network, to reduce bandwidth.

The International Telecommunication Union defines a number of standard codecs which are used to compress telephony signals. Two examples of such codecs which are used in Voice over Internet Protocol (VoIP) calls are G.729AB and G.723.1, which result in data transfer rates of 8 kb/s and 6.4/5.333 kb/s respectively. Both codecs provide acceptable standards of voice quality but since they are not designed to work on non-voice inputs, such as music, they often give unacceptable results when so used. This has the result that when used with common codec standards, MOH delivered to the far-end PBX (where the caller on-hold is located) will be rendered unrecognisable by the encoding, transmission and decoding.

While there are uncompressed codecs (e.g. G.711 A Law) available for packet-based networks, it is wasteful of bandwidth to use these codecs for the transmission of MOH due to the bandwidth-imposed restrictions of the networks.

In applications such as video telephony, the bandwidth requirements will in general be greater, and it is therefore even less desirable to deliver video content to callers who are on hold, even though this might be a desirable feature for customers of video conferencing solutions.

It is therefore an object of the present invention to provide improved quality media content to callers on hold.

SUMMARY OF THE INVENTION

The invention provides a method of providing media content to a caller on hold. The call is placed between first and second locations, each having an associated call control unit, the caller being at the second location and communicating with the first location by means of a telephony terminal. The method of the invention is carried out by the second call control unit and involves the following steps:

a) detecting that the call has been placed on hold by the first call control unit; and
b) activating a media content generator associated with the caller's location to provide locally generated media content to the caller while the caller is on hold.

The invention allows for a reduction in bandwidth for calls which are on hold by allowing the media content (e.g. music or video on hold) to be provided locally at the caller's end, rather than being transmitted across the network.

In cases where telephony calls (whether voice or video) are made over a packet-based wide area network (WAN), significant bandwidth reductions are made. Even where the call terminates on equipment based on a local area network (LAN) at either end, the content generated locally can generally be carried at a higher bandwidth over the LAN using a less compressive codec than is used to carry the call, since most LANs utilise high speed connections between entities on the LAN.

The terms "local" and "remote" as used herein denote symbolic rather than geographical proximity. In other words, entities which are controlled by one another or which are under mutual control are considered as "local" whereas independent parts of a network system are considered as "remote".

The step of detecting preferably involves receiving a signal from the first call control unit that the call has been placed on hold.

In this way, signalling between the two ends acts as an instruction that the call is being held and that locally generated MOH or other content should be switched into the call until the call comes off hold. Generally, the respective call servers will establish at call set-up whether or not they are compliant with the invention, and this information is then used by the first call server (which is placing the call on hold) during the call to decide whether to switch a MOH server into the call, or alternatively, to simply signal to the second server that the second server should locally switch in a MOH server.

Preferably, the media content generator comprises an audio source associated with the second call control unit. Many call servers are traditionally provided with either a built-in MOH unit or an input for receiving MOH from a conventional audio source.

Alternatively, the media content generator may be an audio source associated with the telephony terminal, either as a separate unit or as an integral part of the telephony terminal. The telephony terminal and the source can be mutually connected by a LAN or via traditional connections to a PBX.

As the invention has particular application in calls made over packet-based networks, the telephony terminal, second call control unit and media content generator are preferably each connected to a local area network (LAN) which is connected to the communications network.

In a further preferred embodiment of the method of the invention, the communications network is a packet-based network, and the call is conducted using a first codec, with the method further including the step of causing the telephony terminal to switch to a second codec while receiving content from the media content generator.

The advantage of this feature is that the bandwidth over the WAN can be conserved by using the first (low-bit rate) codec as normal in e.g. VoIP calls. However, when the call is placed on hold, the call server of the held caller is signalled to switch the caller's terminal to a less-compressive codec to receive the locally generated MOH, which will generally be confined to a LAN or local PBX environment which can provide higher bandwidth communications.

In a further preferred embodiment of the method, telephony signals continue to be received from the first location while the call is on hold, with the second call server performing the mixing operation on these signals with the media content from the local media content generator.

This provides the advantage that the first call server can provide the caller with useful information from e.g. a recorded announcement (RAN) unit, via the low bandwidth call codec while the call is held, and these announcements are then mixed in with the locally generated MOH for the caller to listen to. Such announcements might be used, for example, to advertise products or services of the organisation which is holding the call, or to provide the caller with information regarding opportunities to select particular extensions rather than holding further.

The first and/or second call control unit(s) can comprise a private branch exchange (PBX).

In a further aspect the invention provides a method of holding a call placed across a communications network between a first location having a first call control unit and a second location having a second call control unit. The method of this aspect of the invention is carried out by the first call control unit and involves the steps of:

a) placing the call into an on-hold state; and
b) signalling to the second call control unit that the call is on-hold, whereby the second call control unit can provide locally generated media content to the second location while the call remains on hold.

This aspect of the invention provides the complementary steps carried out by the server which initiates the call holding and which enables the call server at the far end to initiate local MOH.

The method preferably also includes the subsequent steps of:

c) placing the call from the on-hold state into an active state; and
d) signalling to the second call control unit that the call is active, whereby the second control unit can finish providing locally generated media content to the second location.

In a further preferred aspect of the method, the second call control unit, on receipt of the signal from the first call control unit that the call is on hold, activates a media content generator associated with the second location to thereby provide locally generated media content to the telephony terminal while the caller is on hold.

In other words, a preferred method of the invention involves the relevant steps being taken by both call servers in combination.

In another aspect there is provided a computer program which when executed causes a call server to:

a) detect that a call made between a telephony terminal under the control of the call server and a remote location has been placed on hold at the remote location; and
b) activate a media content generator associated with the call server to thereby provide locally generated media content to the telephony terminal while the caller is on hold.

In a further aspect the invention provides a computer program which when executed causes a call server to:

a) place a call under the control of the call server on hold; and
b) generate a signal to a remote location to which the call is connected indicating that the call is on hold.

The invention further provides a call server comprising:

a) a call control unit for maintaining control of a call between a telephony terminal associated with the server and a remote location to which the terminal is connected via a communications network;
b) a detector for detecting that a call in which the terminal is involved has been placed on hold at a remote location; and
c) a media content generation actuator for actuating a media content generator associated with the call server to thereby provide media content to the telephony terminal while the call is on hold.

The call server of the invention is preferably either a private branch exchange (PBX) or a public switched telephony network (PSTN) exchange.

The invention further provides a telephony terminal having an associated media content generator and a media control unit for activating the generator and switching the output thereof into the voice channel of a call in which the terminal is involved on receipt of a signal that said call is on hold at a remote location.

The terminal of the invention can be selected from a mobile handset, an analog or digital desktop set, an ethernet set, or a computer running telephony software.

In another aspect, the invention provides a call control signal comprising an electronic indication that an identified call has been placed on hold, said signal being adapted for transmission from a call server associated with the telephony equipment at which the call has been placed on hold, to a remote location across a communications network.

BRIEF DESCRIPTION OF DRAWINGS

The invention will now be illustrated by the following descriptions of embodiments thereof given by way of example only with reference to the accompanying drawings, in which.

DETAILED DESCRIPTION OF PREFERRED EMBODIMENTS

Figure 1:
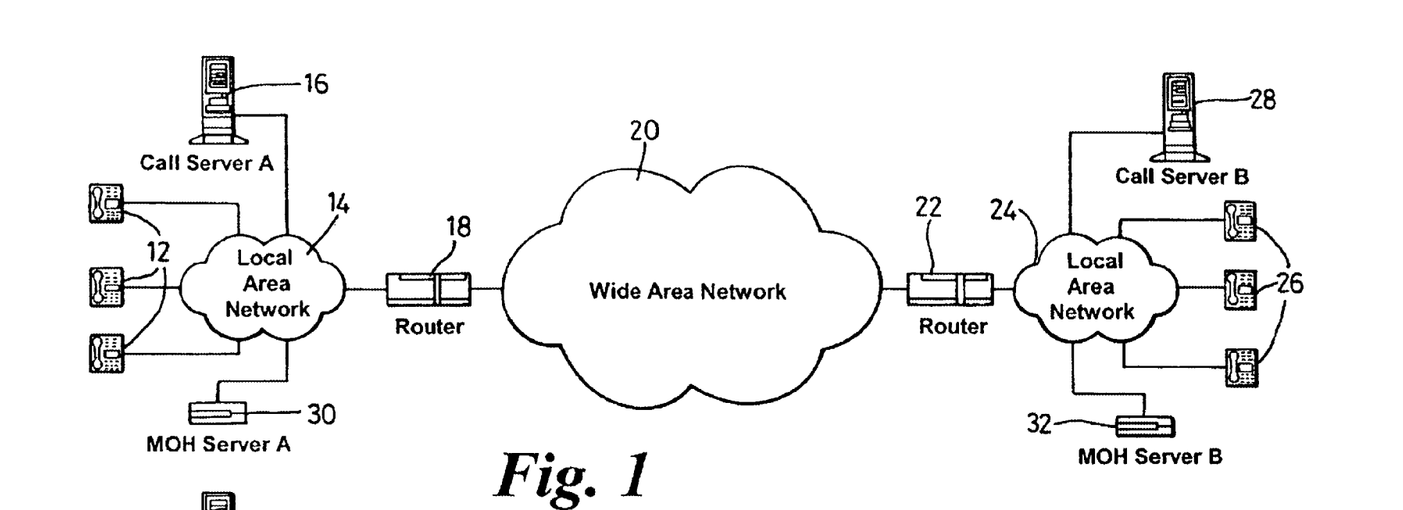
FIG. 1 is a system architecture of a first embodiment of the invention.

FIG. 1 shows an implementation of the invention in which a plurality of telephony terminals 12 are connected within an intranet environment over a first local area network (LAN) 14. Calls over the LAN and from the LAN to external numbers are made under the control of a first call server 16.

LAN 14 is connected via a router 18 to a wide area network (WAN) 20. The WAN uses the transmission control protocol/internet protocol (TCP/IP) to carry packets between nodes on the network, with router 18 being connected at one such node. A second router 22 is connected at another node and a second LAN 24 is connected to router 22. This LAN also connects a plurality of telephony terminals 26 at a second location under the control of a second call server 28. The first and second call servers may be implemented, for example, by the "Meridian 1" call server available from Nortel Networks, Montreal, Canada.

Each LAN is provided with a music-on-hold (MOH) server 30,32. Traditionally, such MOH servers are switched into the voice channel of a call by their local call servers whenever a user places a call on hold, and thus the music provided by the MOH server is substituted for the voice input of the caller who placed the call on hold and this music traverses the network 20.

According to the present invention, however, the two call servers 16,28 identify at call set-up their respective capabilities. As well as the normal information exchanges at this time (e.g. deciding which codec is to be used for the call based on the terminal capabilities, deciding on a bandwidth allocation, etc.), the servers establish that they are compliant with the present invention.

If and when the call is placed on hold by either a user of one of the telephony terminals involved in the call, or some other entity (e.g. a call centre software application answering the call), the normal actions are taken by the call server. Thus, for example, assuming that the user at one of the terminals 12 places the call on hold by pressing the appropriate handset button, a message is passed to the call server indicating that the call is to be held. The server takes control of the call and releases the terminal from the call, allowing the user to e.g. place another call or replace the handset temporarily.

The call server 16 also, however, forwards a message to the call server 28 signalling it that the call is now on hold, and thereby implicitly requesting that call server to provide MOH to the caller at the other end. In one of the most widely used VoIP protocols at the current time, the H.323 standard, a H.245 signalling channel is used to carry call control signals between entities involved in the call. The H.245 standard has user definable messages which can be used to define proprietary signals between endpoints. In this case, a H.245 "Add" message is used to indicate to the call server 28 that the call has been placed on hold by server 16.

This prompts call server 28 to signal the local MOH server 32 to provide MOH to the appropriate one of telephony terminals 26. The signalling between the call server and the MOH server can be conducted using Media Gateway Control signals (e.g. the Megaco standard defined by ITU H.248).

The instruction from the call server 28 to the MOH server 32 will identify the network address of the appropriate terminal 26, and the MOH will then be delivered by means of the RTP protocol. The instruction to the MOH server will typically also include an identification of the codec to be used, which may be an uncompressed codec such as G.711.

At the same time, the call server 28 will signal to the relevant telephony terminal that it should switch from the codec used to carry voice packets over the WAN to this new uncompressed protocol, so that this terminal is in a position to receive and correctly decode RTP packets arriving from the MOH server. Typically, the server 28 will send a confirmatory message back to the first call server 16, although this is not crucial.

When the call is taken off hold at the first location, the first call server 16 sends a message to this effect using the H.245 messaging protocol, and this message causes the second server to instruct the MOH server to cease broadcasting packets to the terminal 26, and also instruct the terminal to revert to the original voice codec in order that the call may be resumed.

Even in cases where the WAN has the capability to carry uncompressed music using e.g. G.711, most networks will be engineered to assume that there is a certain amount of end-to-end silence between both parties. In other words, even as a conversation is on-going, packets are only transmitted when there is actually a voice input at either end, and such voice inputs are sporadic. The network engineers therefore typically assume that there will be silence in most calls for a certain proportion of the time. MOH typically involves very little if any silence, and thus tends to require not only uncompressed codecs, but also a constant stream of packets across the network. By confining the flow of packets to the LANs at either end, therefore, these valuable network resources are maintained.

It will be appreciated that the scenario shown in FIG. 1 is symmetric, so that the second call server 28 could equally place a call on hold, causing the first call server to activate its local MOH server to play music to one of the local terminals 12.

Figure 2:
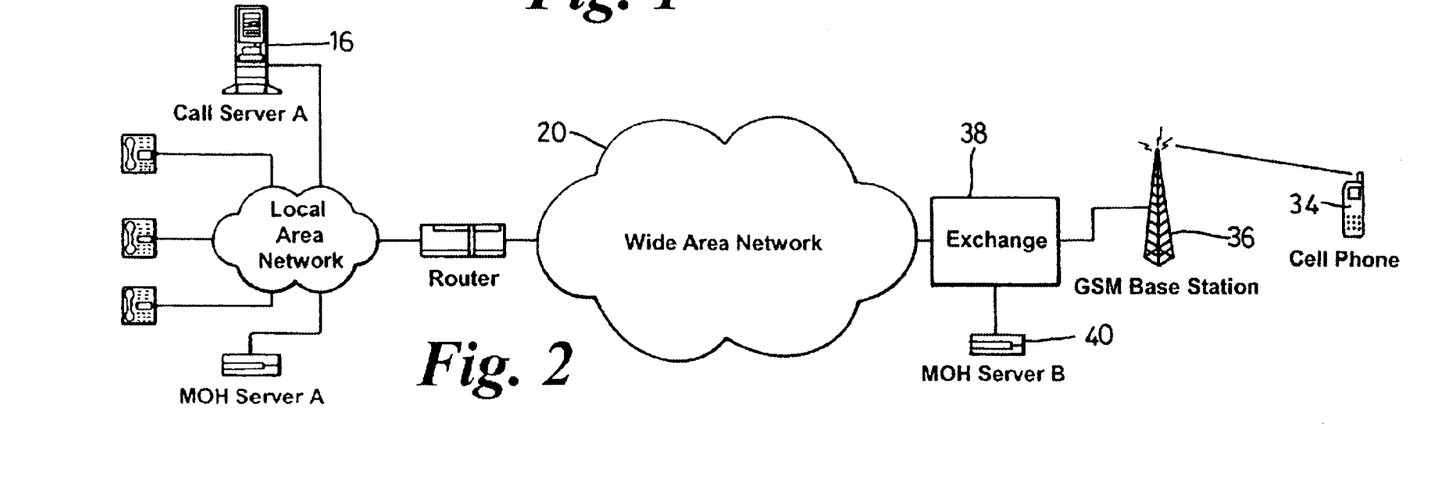
FIG. 2 is a system architecture of a second embodiment of the invention.

FIG. 2 shows an implementation of the invention in which the architecture at the first location (which places the call on hold) is identical to that of FIG. 1. However, in this case the caller being placed on hold is a mobile caller using a cell phone 34 connected by the global system for mobiles (GSM) or similar protocol to a base station 36. The base station 36 in turn passes the call signals to an exchange 38 of the caller's mobile service provider which is connected to the WAN 20.

The exchange 38 is provided with a MOH server 40, and performs the function of the second call control unit referred to previously. Thus, it receives signals from the call server 16 indicating that the call has been placed on hold, and the exchange software interprets these signals to switch the output of the MOH server into the voice channel of the call. The music is thus broadcast to the cell phone handset via the base station, again avoiding the necessity of carrying the MOH over the packet-based WAN.

In a variation of the system shown in FIG. 2, the MOH server 40 may be omitted if the mobile handset has the capability of storing and playing music itself, or if it can access another music source while on hold. In the first of these scenarios, the phone will have the capability of storing music files in a high quality format, e.g. the MP3 format, and this capability will be known to the exchange software. When the call is placed on hold, the appropriate message is simply passed along by the exchange to the handset, which maintains open the call connection, but switches the audio output to the user from the call to the built-in MP3 player in the handset. The handset monitors for the further signal that the call has been taken off hold, at which point it switches the call back into the audio output and disables the MP3 player.

In the second alternative scenario, the handset uses the "on-hold" signal received from the call server 16 via the exchange 38 as an instruction to initiate a second call, while maintaining the first call. This second call will be to a media provider, such as a music service or a talk-based information service. It could also be a connection to a wireless application protocol (WAP) Internet site. Thus, when the mobile handset is told that the call is on hold, the caller is switched to a new audio media source or a browser connection is opened. The caller is free to enjoy and utilise this new media content until the "off hold" signal is received following which the new (second) call is disconnected and the caller is switched back to the first call which has been maintained on hold by the handset itself.

For phones employing 2.5G and 3G wireless technology, a second call to a WAP server is not required and thus a default web page can be called up when the call is placed on hold.

Figure 3:
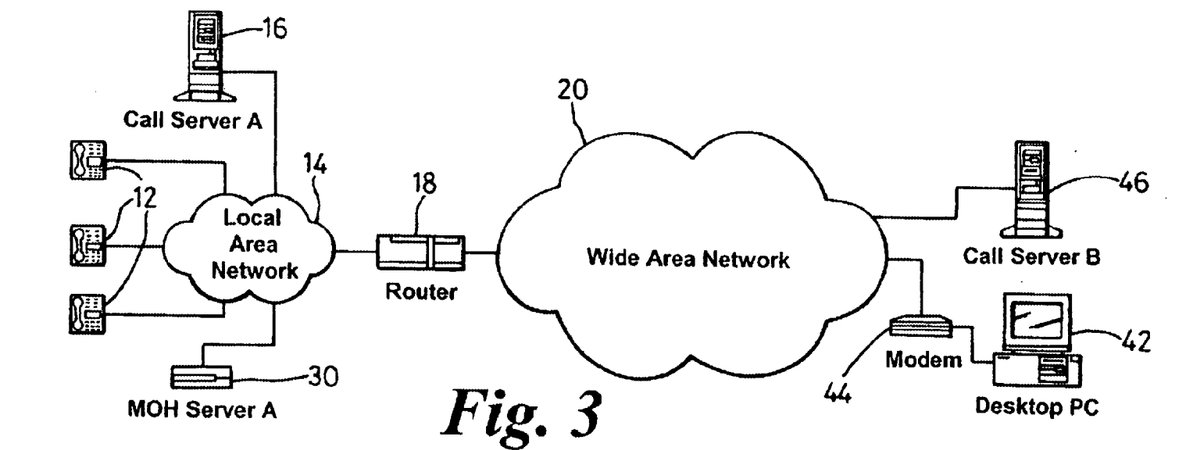
FIG. 3 is a system architecture of a third embodiment of the invention.

In the embodiment shown in FIG. 3, the left-hand side of the architecture is again unchanged but the caller at the second location uses a desktop PC 42 running telephony software to connect to the Internet (WAN 20) via a modem 44. The call from the second location is under the control of a call server 46, but the only connection between call server 46 and PC 42 is via the WAN.

When the call is placed on hold at the first location, a message is again sent from the first call server 16 to the second call server 46. Rather than switching in a MOH server, however, the call server 46 simply instructs the PC 42 that the call has been placed on hold and allows the PC to select the type of media content to play to the caller. Typically, the user of the PC will have predefined this in the telephony software but it could be e.g. music or video stored on the PC or in a connected device, or it could be a game loaded on the PC, or it could be an instruction to open a browser window to access a particular website. Again, in any case, while the call remains on hold, some type of locally generated content is provided to the caller, or a website is accessed by the caller, avoiding the necessity of providing MOH over the WAN while on hold.

Figure 4:
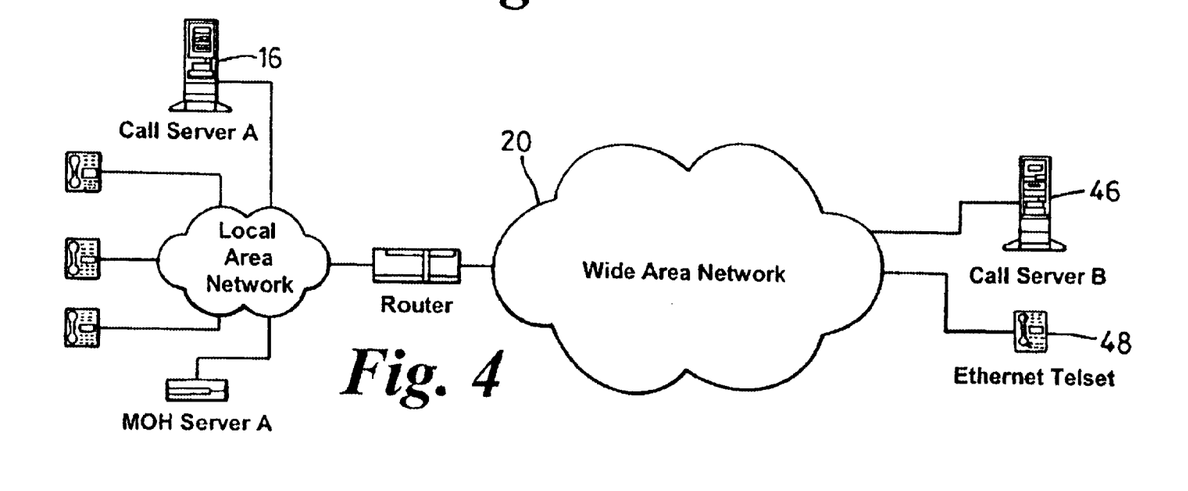
FIG. 4 is a system architecture of a fourth embodiment of the invention.

FIG. 4 shows a similar scenario to that of FIG. 3, but with the difference that the user is making the call from an ethernet set. This ethernet set 48 has an in-built MOH capability, and thus when the second call server 46 receives the information that the call is on hold, it issues a H.245 instruction to the set 48 to activate its in-built MOH facility until instructed that the call has been taken off hold.

Figure 5:
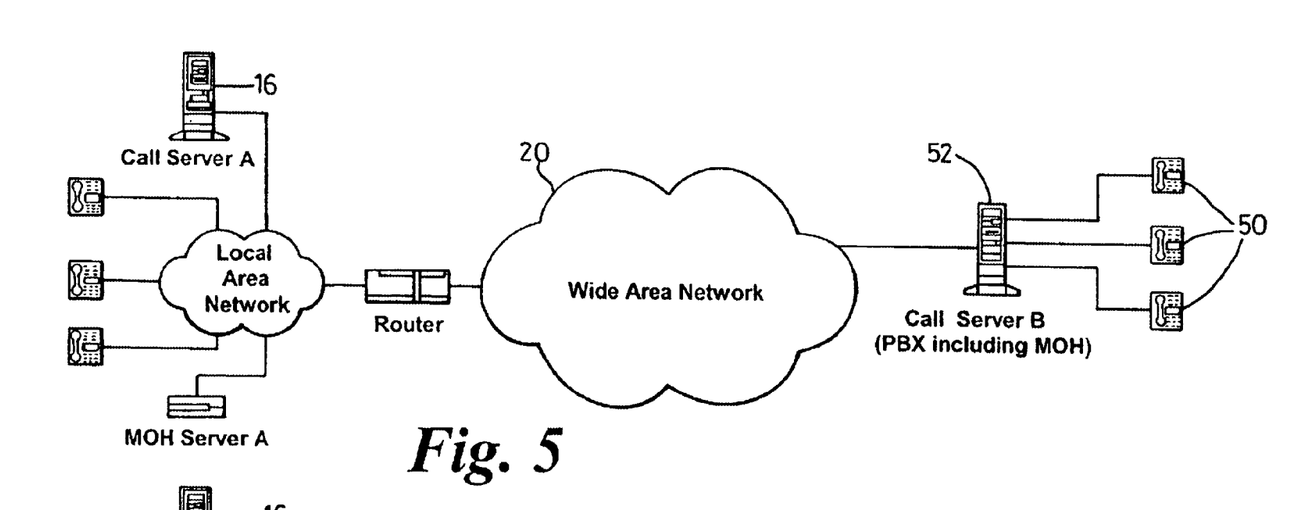
FIG. 5 is a system architecture of a fifth embodiment of the invention.

In the FIG. 5 embodiment, a plurality of telephone sets 50 at the second location are connected via an analog connection to a call server 52 in the form of a PBX having a built-in MOH server. The operation of this embodiment is similar to those previously described with the difference that signals from call server 16 to server 52 that a call from one of the sets 50 has been placed on hold, cause server 52 to switch the output of the MOH server into the voice channel leading to the telephone set in question. When the call comes off hold, the voice connection to the WAN 20 is again restored.

Figure 6:
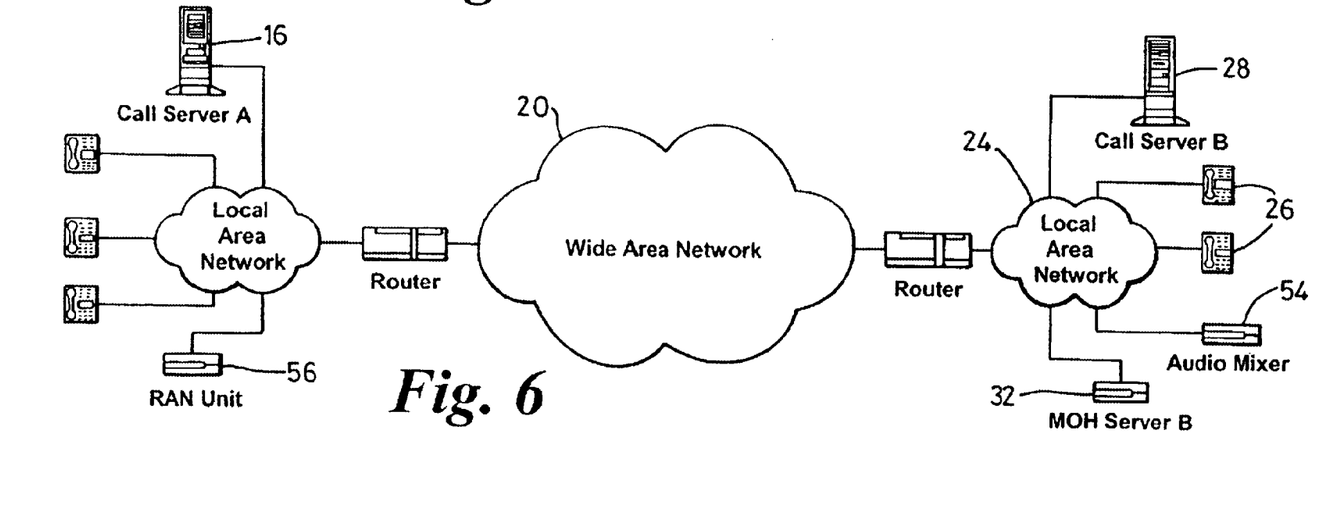
FIG. 6 is a system architecture of a sixth embodiment of the invention.

In FIG. 6 yet another embodiment is shown. This embodiment is generally similar to that of FIG. 1 with the differences that (i) one of the terminals 26 at the second location has been replaced by an audio mixer 54 which is adapted to combine two or more audio inputs and output the mixed signals on a single voice channel, and (ii) the MOH server at the first location has been replaced by a recorded announcement (RAN) server 56 which is adapted to play a number of pre-recorded voice messages rather than simply a stream of music.

When call server 16 places a call on hold, it signals this fact to call server 28 in the manner previously described. It also, however, activates the RAN unit 56 to play a series of messages at intervals while the call remains on hold. These messages are output to the original destination address of the call (one of the terminals 26) over the WAN 20 using the original VoIP codec chosen for the call.

Call server 28 switches on the local MOH server 32 and the mixing unit 54. MOH server 32 is instructed to output MOH to the LAN address of the mixer unit 54, and this mixer unit is in turn instructed to direct its output to the terminal 26 involved in the call, using an uncompressed codec. Server 28 also instructs the terminal 26 to switch to the same uncompressed codec, as previously described. While the call remains on hold, voice packets arriving over the WAN 20 from RAN server 56 are redirected to the mixing unit where they form an input. The mixing unit mixes this voice input with the MOH input according to a pre-defined algorithm (e.g. the volume of the music might be lowered while the voice input is arriving, so that the voice signal can be clearly heard in the mixer output over the reduced volume music, with the music volume restored during the periods between voice announcement. This mixed output is then provided to the caller who hears the RAN messages over the locally generated MOH. The advantage of this embodiment is that only the compressed codec is used to transmit the RAN messages over the WAN, while the higher quality codec is used for the music and combined music voice signals sent over the LAN.

Figure 7:
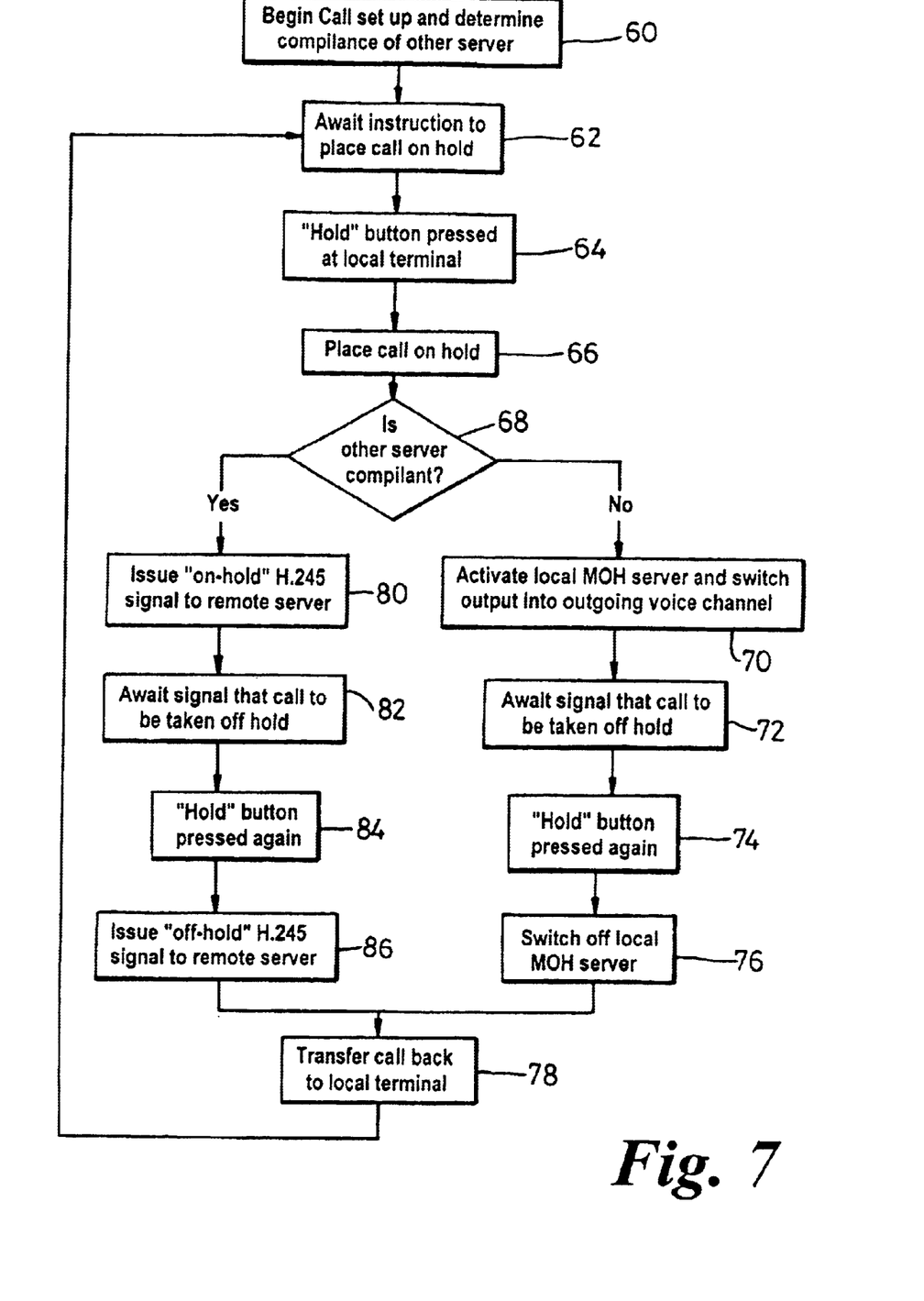
FIG. 7 is a flow chart of the operation of server software at the server placing a call on hold.
Figure 8:
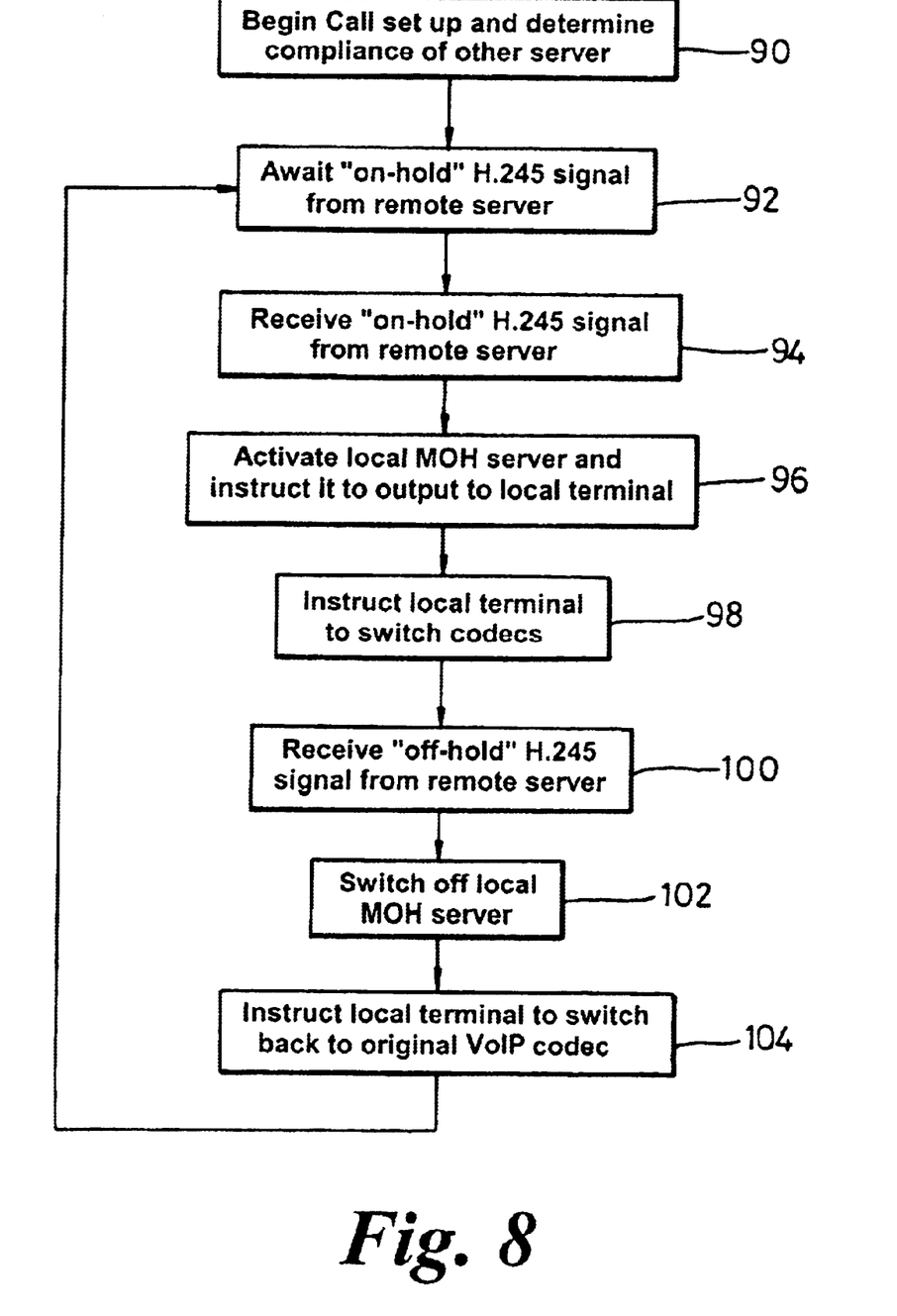
FIG. 8 is a flow chart of the operation of server software at the server of the caller who has been remotely placed on hold.

FIGS. 7 and 8 show the operation of the control software running at the first and second servers of e.g. FIG. 1, respectively. In practice a single piece of software will control the operation of a server both when it acts to place a call on hold and when it is informed that a call made to or from one of its local terminals has been remotely placed in hold, but for clarity the operation of both aspects of the invention will be described separately with reference to the flow charts of FIGS. 7 and 8.

In the flow chart of FIG. 7, the first server, during call set up, step 60, determines whether or not the server controlling the other end of the call is compliant with the invention (as well as determining all other call parameters to be established between the two ends). The server software module controlling the operation of the invention then enters a waiting mode, step 62, until the call is placed on hold by e.g. the local caller pressing a hold button on his or her telephone set, step 64. The server then places the call on hold as normal, step 66, e.g. by freeing the terminal from the call and terminating the call at the server to allow the terminal to make other calls or to hang up temporarily.

When the call is placed on hold, the software determines whether or not the other server is compliant with the invention (from the call set-up capability exchange), step 68. Taking the case first where the other server is not compliant, the server switches on a local MOH server, step 70, and switches the output into the outgoing voice channel of the call.

The server then awaits a signal that the call is to be taken off hold, step 72, determined by the local user again pressing the hold button (or the line button of the line on which the call is being held), step 74, following which the server switches off the MOH server, step 76, and returns the active call to the terminal, step 78.

If the other server is compliant, however, a different sequence of steps is followed according to the invention. In this case, when the call is placed on hold, the local MOH server is not activated, but instead a H.245 signal is passed to the remote server, step 80, instructing it to provide the media content to its own terminal while the call is on hold. The first server then awaits the instruction to take the call off hold, step 82, determined by the hold button being pressed by the user, step 84, following which the first server sends a second message to the second server, indicating that the call is being taken off hold, step 86. The call is then returned to the terminal, step 78, following which the software module awaits the next "hold" instruction, step 62.

In the software module running on the second server, FIG. 8, the call set up, step 90, identifies to this server that the remote server controlling the other end of the call is compliant and thus that H.245 messages can be expected if the call is placed remotely on hold. The server thus awaits such messages, step 92, and on receipt of such a message, step 94, the server activates its local MOH server, step 96, and instructs it to output to the local terminal involved in the call in question. This instruction will also identify to the MOH server which (generally uncompressed) codec it should use to transmit the RTP packets containing the MOH. At the same time, the server instructs the local terminal to switch to this new codec to allow it to receive and decode the RTP packets from the local MOH server, step 98.

The MOH server continues to provide MOH to its local terminal until the call server receives a further signal from the remote server that the call is being taken off hold, step 100, at which point it instructs the MOH server to stop transmission, step 102, and instructs the local terminal to revert to the original VoIP (compressive) codec allowing conversation to resume, step 104. The process then reverts to step 92 awaiting a further signal that the call is again on hold.

While the invention has been primarily described in relation to voice calls and the provision of music on hold, it will be appreciated that the invention is also applicable to other telephony applications such as e.g. video telephony, in which case the content played to the caller on hold may involve visual and/or audio media streams.

The invention is not limited to the embodiments described herein which may be varied without departing from the spirit of the invention.

What is claimed is:

1. A method of providing media content to a caller on hold in a call placed across a communications network between first and second locations, said first location having a first call control unit associated therewith and said second location having a second call control unit associated therewith, said caller being at said second location and communicatig with the first location by means of a telephony terminal, said method carried out by the second call control unit and comprising the steps:
   a) detecting that the call has been placed on hold by the first call control unit;
   b) activating a media content generator associated with said second location to thereby provide locally generated media content to the telephony terminal while the caller is on hold;
   c) receiving telephony signals from the first location while the call is on hold; and
   d) mixing said received telephony signals with any audio media content from the local media content generator.

2. A method according to claim 1, wherein said step of detecting comprises receiving a signal from the first call control unit that the call has been placed on hold.

3. A method according to claim 1, wherein said media content generator comprises an audio source associated with the second call control unit.

4. A method according to claim 1, wherein said media content generator comprises an audio source associated with said telephony terminal.

5. A method according to claim 4, wherein said audio source comprises a memory for storing audio content and a playback unit, both the memory and the playback unit forming part of said terminal.

6. A method according to claim 1, wherein said media content generator comprises an Internet connection associated with said telephony terminal, and wherein said locally generated media content is accessed from a remote Internet site before being presented to said caller at said telephony terminal.

7. A method according to claim 1, wherein said telephony terminal, said second call control unit and said media content generator are each connected to a local area network (LAN) which is connected to said communications network.

8. A method according to claim 7, wherein said communications network is a packet-based network, and wherein said call is conducted using a first codec, said method further comprising the step of causing said telephony terminal to switch to a second codec while receiving content from said media content generator.

9. A method according to claim 1, wherein the first and/or second call control unit(s) comprise a private branch exchange.

10. A method of holding a call placed across a communications network between a first location having a first call control unit associated therewith and a second location having a second call control unit associated therewith, said method carried out by the first call control unit and comprising the steps of:
    a) placing the call into an on-hold state;
    b) signalling to the second call control unit that the call is on-hold, whereby said second call control unit can provide locally generated media content to said second location while the call remains on hold; and
    c) continuing to send telephony signals across the communications network from the first location to the second location while the call is on hold, whereby the on-hold telephony signals can be mixed with any locally generated audio media content by the second call control centre.

11. A method according to claim 10, further comprising the subsequent steps of:
    a) placing the call from the on-hold state into an active state; and
    b) signalling to the second call control unit that the call is active, whereby said second control unit can finish providing locally generated media content to said second location.

12. A method as claimed in claim 10, further comprising the step, carried out by the second call control unit on receipt of the signal from the first call control unit that the call is on hold, of activating a media content generator associated with said second location to thereby provide locally generated media content to the telephony terminal while the caller is on hold.

13. A computer program product in machine readable form containing instructions which when executed cause a call control unit to:
    a) detect that a call made between a telephony terminal under the control of the call control unit and a remote location has been placed on held at said remote location;
    b) activate a media content generator associated with said call control unit to thereby provide locally generated media content to the telephony terminal while the caller is on hold;
    c) receive telephony signals from the first location while the call is on hold; and
    d) mix said received telephony signals with any audio media content from the local media content generator.

14. A computer program product in machine readable form containing instructions which when executed cause a call control unit to:
    a) place a call under the control of the call control unit on hold; and
    b) generate a signal to a remote location to which the call is connected indicating that the call is on hold; and c) continue to send telephony signals across the communications network from the first location to the second location while the call is on hold, whereby the on-hold telephony signals can be mixed with any locally generated audio media content by the second call control centre.

15. A call server comprising:
   a) a call control unit for maintaining control of a call between a telephony terminal associated with the server and a remote location to which the terminal is connected via a communications network;
   b) a detector for detecting that a call in which the terminal is involved has been placed on hold at a remote location;
   c) a media content generation actuator for actuating a media content generator associated with the call server to thereby provide media content to the telephony terminal while the call is on hold; and
   d) a mixer for receiving telephony signals from the first location while the call is on hold and mixing said received telephony signals with any audio media content from the local media content generator.

16. A call server as claimed in claim 15, wherein said server is selected from a private branch exchange (PBX) or a public switched telephony network (PSTN) exchange.

17. A telephony terminal having an associated media content generator, a media control unit for activating said generator and switching the output thereof into the voice channel of a call in which the terminal is involved on receipt of a signal that said call is on hold at a remote location, and a mixer for receiving telephony signals from the first location while the call is on hold and mixing said received telephony signals with any audio media content from the local media content generator.

18. A communications network including a call server, wherein said call server comprises:
   a) a call unit for maintaining control of a call between a telephony terminal associated with the server and a remote location to which the terminal is connected via said communications network;
   b) a detector for detecting that a call in which the terminal is involved has been placed on hold at a remote location;
   c) a media content generation actuator for actuating a media content to the telephony terminal while the call is on hold; and
   d) a mixer for receiving telephony signals from the first location while the call is on hold and mixing said received telephony signals with any media audio content from the local media content generator.

19. A method of providing media content to a caller on hold in a call placed across a communications network between first and second locations, said first location having a first call control unit associated therewith and said second location having a second call control unit associated therewith, said caller being at said second location and communicating with the first location by means of a telephony terminal, said method carried out by the second call control unit and comprising the steps of:
   a) detecting that the call has been placed on hold by the first call control unit;
   b) activating a media content generator associated with said second location to thereby provide locally generated media content to the telephony terminal while the caller is on hold, wherein said telephony terminal, said second call control unit and said media content generator are each connected to a local area network (LAN) which is connected to said communications network; and
   c) causing said telephony terminal to switch from a first codec, used to transmit the call over the communications network to a second codec, used to transmit content from said media content generator over the local area network.

20. A method according to claim 19, wherein said step of detecting comprises receiving a signal from the first call control unit that the call has been placed on hold.

21. A method according to claim 19, wherein said media content generator comprises an audio source associated with the second call control unit.

22. A method according to claim 19, wherein said media content generator comprises an audio source associated with said telephony terminal.

23. A method according to claim 4, wherein said audio source comprises a memory for storing audio content and a playback unit, both the memory and the playback unit forming part of said terminal.

24. A method according to claim 19, wherein said media content generator comprises an Internet connection associated with said telephony terminal, and wherein said locally generated media content is accessed from a remote Internet site before being presented to said caller at said telephony terminal.

25. A method according to claim 19, wherein the first and/or second call control unit(s) comprise a private branch exchange.

26. A method according to claim 19, further comprising the step of receiving telephony signals from the first location while the call is on hold and mixing said received telephony signals with the media content from the local media content generator.

27. A computer program product in machine readable form containing instructions which when executed cause a call control unit to:
   a) detect that a call made between a telephony terminal under the control of the call control unit and a remote location has been placed on hold at said remote location;
   b) activate a media content generator associated with said call control unit to thereby provide locally generated media content to the telephony terminal while the caller is on hold;
   c) switch the encoding of data employed by the telephony terminal from a first codec, used to transmit telephony data within the call, to a second codec, used to transmit locally generated media content from the media content generator.

28. A call server comprising:
   a) a call control unit for maintaining control of a call between a telephony terminal associated with the server and a remote location to which the terminal is connected via a communications network;
   b) a detector for detecting that a call in which the terminal is involved has been placed on hold at a remote location;
   c) a media content generation actuator for actuating a media content generator associated with the call server to thereby provide media content to the telephony terminal while the call in on hold;
   d) a switch associated with the detector for switching the data encoding for the call from a first codec, used for transmit call signals between the telephony terminal and the remote location, and a second codec, used to transmit content from said media content generator over the local area network, said switch being actuated on detection that the call has been placed on hold.

29. A communications network including a call server, wherein said call server comprises:

a) a call control unit for maintaining control of a call between a telephony terminal associated with the server and a remote location to which the terminal is connected via a communications network;

b) a detector for detecting that a call in which the terminal is involved has been placed on hold at a remote location;

c) a media content generation actuator for actuating a media content generator associated with the call server to thereby provide media content to the telephony terminal while the call is on hold;

d) a switch associated with the detector for switching the data encoding for the call from a first codec, used for transmit call signals between the telephony terminal and the remote location, and a second codec, used to transmit content from said media content generator over the local area network, said switch being actuated on detection that the call has been placed on hold.

* * * * *